(12) United States Patent
Meunier

(10) Patent No.: US 6,714,867 B2
(45) Date of Patent: Mar. 30, 2004

(54) METHOD FOR SEISMIC MONITORING OF AN UNDERGROUND ZONE BY SIMULTANEOUS USE OF SERERVAL VIBROSEISMIC SOURCES

(75) Inventor: Julien Meunier, Paris (FR)

(73) Assignees: Institut Francais du Petrole, Rueil-Malmaison cedex (FR); Gas de France, Paris cedex 17 (FR); Compagnie Generale de Geophysique, Massy cedex (FR)

( * ) Notice: Subject to any disclaimer, the term of this patent is extended or adjusted under 35 U.S.C. 154(b) by 37 days.

(21) Appl. No.: 09/958,851
(22) PCT Filed: Feb. 9, 2001
(86) PCT No.: PCT/FR01/00379
§ 371 (c)(1), (2), (4) Date: Oct. 15, 2001
(87) PCT Pub. No.: WO01/59481
PCT Pub. Date: Aug. 16, 2001

(65) Prior Publication Data
US 2002/0191490 A1 Dec. 19, 2002

(30) Foreign Application Priority Data
Feb. 14, 2000 (FR) .............................. 00 01792

(51) Int. Cl.$^7$ .............................. G01V 3/00; G01V 1/00
(52) U.S. Cl. ............................................ 702/2; 367/73
(58) Field of Search .................... 702/2; 367/41, 367/59, 140, 73

(56) References Cited

U.S. PATENT DOCUMENTS

| | | | | |
|---|---|---|---|---|
| 3,568,142 A | * | 3/1971 | Landrum, Jr. et al. | 367/43 |
| 4,295,213 A | * | 10/1981 | Mifsud | 367/41 |
| 4,686,654 A | * | 8/1987 | Savit | 367/41 |
| 4,751,687 A | * | 6/1988 | Christensen | 367/22 |
| 4,823,326 A | * | 4/1989 | Ward | 367/41 |
| 5,327,399 A | * | 7/1994 | Asada et al. | 367/190 |
| 5,798,982 A | * | 8/1998 | He et al. | 367/73 |
| 6,529,833 B2 | * | 3/2003 | Fanini et al. | 702/7 |

OTHER PUBLICATIONS

"Reservoir Monitoring: A Multidisciplinary Feasibility Study", Biondi et al., The Leading Edge, Oct. 1998.*

* cited by examiner

Primary Examiner—John Barlow
Assistant Examiner—Toan M Le
(74) Attorney, Agent, or Firm—Antonelli, Terry, Stout & Kraus, LLP

(57) ABSTRACT

Method and system intended for seismic monitoring of an underground zone (1), comprising simultaneously using several seismic vibrators. The system comprises for example several local units (LU) comprising each a vibrator (5), a seismic pickup antenna (2), a local acquisition and processing unit (6), and a central control and synchronization unit (8) for simultaneously controlling the various vibrators by means of orthogonal signals, local units (6) being suited, by means of particular; processing, to isolate and to reconstitute the seismograms corresponding to the contributions of the various vibrators. Applications: monitoring of a hydrocarbon reservoir during production or of a reservoir used for gas storage for example.

13 Claims, 3 Drawing Sheets

METHOD FOR SEISMIC MONITORING OF AN UNDERGROUND ZONE BY SIMULTANEOUS USE OF SERERVAL VIBROSEISMIC SOURCES

BACKGROUND OF THE INVENTION

1. Field of the Invention

The present invention relates to a method and to a device intended for seismic monitoring of an underground zone such as a reservoir, comprising simultaneously using seismic vibrators.

2. Description of the Prior Art

It is well-known to monitor the long-term state variations of a reservoir during production, such as a hydrocarbon reservoir or a reservoir intended for gas storage, by means of a seismic system comprising an impulsive seismic source or a seismic vibrator emitting seismic waves in the ground and a reception device comprising seismic pickups arranged at the surface or in wells and coupled with the formations to be monitored. At predetermined time intervals, seismic investigations are carried out with wave emission, the waves reflected by the subsoil discontinuities are received and seismograms are recorded, so as to determine by comparison the changes that take place in the reservoir as a result of the development thereof.

Various long-term seismic monitoring systems are described for example in patents U.S. Pat. Nos. 5,461,594, 4,775,009, and 5,724,311 and French Patent 2,775,349.

U.S. Pat. No. 5,724,311 and French Patent 2,775,349 notably describe systems intended for seismic monitoring of an underground zone during development which may be for example a hydrocarbon reservoir or a gas storage reservoir. As diagrammatically shown in FIGS. 1 to 3, these systems comprise for example a network of seismic antennas 2 consisting each of a series of seismic pickups 4 arranged at regular intervals along a well 3 drilled in the ground. This network can be regular as shown in FIG. 2, or irregular. The pickups can be one-directional geophones oriented vertically or multi-axis geophones (triphones) and/or hydrophones. A seismic source 5 is arranged in the vicinity of each antenna 2. Piezoelectric type vibrators, such as those described in French patent application 99/04,001 are advantageously used as sources and permanently installed in the immediate neighbourhood of each antenna 2.

The seismic waves generated by the or by each seismic source 5 are propagated downwards (downgoing waves 9). These incident waves are first recorded by receivers 4 in each well 3. The waves reflected by the discontinuities of the zone (seismic interfaces) are propagated upwards. These upgoing waves 10 are also recorded by the various receivers 4. The upgoing waves and the downgoing waves are thus superimposed on the seismograms. They are usually processed by means of a method similar to the VSP (Vertical Seismic Profiles) processing method which is well-known to those skilled in the art.

The various sources of the seismic system can be actuated successively by providing, between each triggering, a sufficient time interval for reception of the waves reflected by the investigated zone. Several seismic sources emitting the;same signals can also be used and triggered simultaneously in order to increase the power emitted.

U.S. Pat. No. 4,780,856 also describes a marine seismic prospecting method comprising emission of seismic waves by a vibrator or simultaneously by several vibrators controlled by coded vibrational signals according to a pseudo-random code.

SUMMARY OF THE INVENTION

The method according to the invention allows seismic monitoring of an underground formation. It comprises:

emission of seismic waves in the formation by coupling with the formation at least two vibrators which seismic waves simultaneously and are controlled by orthogonal signals so as to form a composite vibrational signal, reception of the signals reflected by the formation in response to the emission of seismic waves, recording the signals received by at least one seismic pickup, and formation of seismograms by processing the signals recorded, comprising discrimination of the respective contributions of the vibrators to the composite vibrational signal and reconstruction of seismograms equivalent to those that would be obtained by actuating the vibrators separately.

Sinusoidal signals of different frequencies, in their fundamental components as well as in their respective harmonics, or signals based on wavelets, on Legendre polynomials or on random series, etc, are for example used as orthogonal signals.

In the case of the emitted orthogonal signals being sinusoids, discrimination of the respective contributions of the vibrators is for example carried out by determining the amplitude and the phase of the composite vibrational signal at the fundamental frequencies of the pilot signals applied to the vibrators.

Discrimination of the respective contributions of the vibrators comprises for example weighting the recorded signal by a bell weighting (or tapering) factor and determining the amplitude and the phase of the composite signal.

In order to carry out discrimination of the respective contributions of the vibrators, a selection by Fourier transform of the lines of the complex spectrum respectively associated with the various weighted signals is for example performed.

Reconstruction of the seismograms, specifically corresponding to the various vibrators, is performed for example by applying, after separation thereof, an inverse Fourier transform to the lines respectively associated with the various weighted signals.

According to an implementation mode, the frequencies of the orthogonal pilot signals respectively applied to the various vibrators are shifted by frequency intervals, at predetermined time intervals, so as to sweep a certain emission frequency band.

The system of seismic monitoring of an underground formation according to the invention comprises means allowing emission of seismic vibrations in the formation comprising at least two vibrators and means for generating orthogonal signals and for applying the orthogonal signals respectively to the vibrators so as to generate in the formation a composite vibrational signal, means for receiving the signals reflected by the formation in response to the emission of seismic waves, means for recording the signals received by the means for receiving and means for processing the signals recorded in order to form seismograms, comprising at least one computer which discriminates respective contributions of the vibrators to the composite vibrational signal and reconstructs seismograms equivalent to those that would be obtained by separately actuating the vibrators.

According to a first implementation mode, the system comprises at least two local units arranged at a distance from one another and coupled with the formation. Each unit comprises at least one seismic pickup, a seismic vibrator, a local device which acquires and processes the received signals , and a central control and synchronization unit connected to the various units, comprising a generator which applies orthogonal vibrator pilot signal to the vibrators.

According to another implementation mode, the system comprises at least two local units arranged at a distance from one another and coupled with the formation. Each unit comprises at least one seismic pickup, a seismic vibrator, and a central control and synchronization unit connected to the various local units by a coupling mechanism (cables for example) or a wireless link (radio) and comprising a signal generator which forms the orthogonal vibrational pilot signals, and means which acquires signals received by antennas and which reconstructs seismograms corresponding to the contributions of the vibrators.

The reception means comprise, for example, at least one antenna comprising seismic pickups arranged along a well drilled in the formation and which is connected to the recording means.

BRIEF DESCRIPTION OF THE DRAWINGS

Other features and advantages of the method and of the system according to the invention will be clear from reading the description hereafter of non limitative examples, with reference to the accompanying drawings wherein.

DETAILED DESCRIPTION OF THE PREFERRED EMBODIMENTS

The method of the invention allows carrying out seismic monitoring operations in an underground zone by using a series of seismic pickups and a plurality of vibrators simultaneously actuated by signals at different frequencies selected so as to allow discrimination of the contributions of each source on the seismograms formed from the signals received and recorded. This is generally done through control of the various sources by "orthogonal " signals representing functions referred to as orthogonal functions, well-known to those skilled in the art, and by using well-known numerical calculation techniques such as the inverse Fourier transform for separating the contributions to the seismograms obtained of the various vibrators, as explained hereafter by means of the following notations:

| Convolution | * | |
| --- | --- | --- |
| Correlation | ★ | |
| Emission length | $t_s$ | (seconds) |
| Listening period | $t_e$ | (seconds) |

-continued

| Sampling interval | $t_i$ | (seconds) |
| --- | --- | --- |
| Initial frequency | $f_b$ | (Hertz) |
| Final frequency | $f_f$ | (Hertz) |
| Elementary frequency | $f_i = 1/t_e$ | (Hertz) |
| Line width | $f_d$ | (Hertz) |

A—Orthogonal functions

Figure 6:
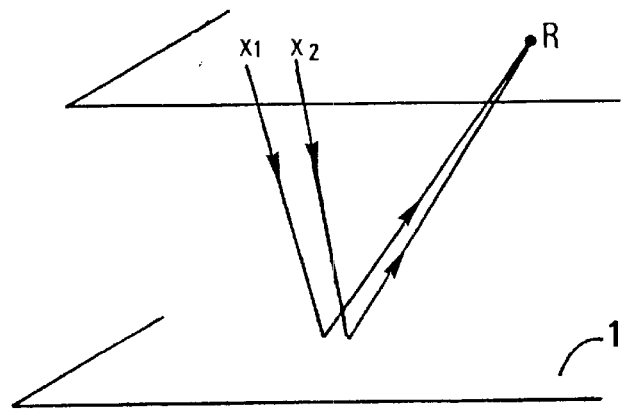

Two unit sinusoidal signals $P_1$ and $P_2$ of respective frequencies $f_1$ and $f_2$ emitted by two sources $S_1$ and $S_2$ located at points $X_1$ and $X_2$ (FIG. 6) for a duration $t_s$ whose value is great compared to $1/f_1$ and $1/f_2$ are considered.

$P_1 = \sin 2\pi f_1 t$ $P_2 = \sin 2\pi f_2 t$

The recorded seismogram of the signals received at a reception point R from source $S_1$ emitting alone is: $T_{1=A1} \sin(2\pi f_1 t - \Phi_1)$, where $\Phi_1$ is a phase lag.

Similarly, the seismogram observed at the same point R from $S_2$ emitting alone is: $T_2 = A_2 \sin(2\pi f_2 t - \Phi_2)$, where $\Phi_2$ is also a phase lag.

If $S_1$ and $S_2$ emit simultaneously, the linearity of the transmission of the seismic waves implies that the seismogram of the waves received at R is the sum of $T_1$ and $T_2$.

Furthermore, if $f_1 \neq f_2$,

| $P_2 \star P_1 = 0$ | (A), |
| --- | --- |
| $T \star P_1 = T_1 \star P_1$ | (B), and |
| $T \star P_2 = T_2 \star P_2$ | (C). |

Equation (A) expresses the orthogonality of signals $P_1$ and $P_2$; equations (B) and (C) express the possibility of separating composite signal T into its two components. This property theoretically applies to any number of sources emitting sinusoids of different frequencies or more precisely orthogonal signals but, in practice, the number of sources has to be limited because of the following phenomena:

a) the distortion which cannot be disregarded with mechanical sources. As source $S_1$ emits frequency $f_1$, source $S_1$ also emits frequencies $2f_1, 3f_1 \ldots nf_1$. Consequently, if $f_i$ and $f_j$ are the respective frequencies of the two sources $S_i$ and $S_j$ of the array of sources, $f_i \neq f_j$, as well as $f_i \neq 2f_j, f_i \neq 3f_j, \ldots f_i \neq nf_j$ must be satisfied;

b) the necessarily truncated nature of emission length ($t_s$), which is expressed in the frequency domain by means of a convolution of the line (impulse) by the Fourier transform of the truncation. If the latter is sudden (multiplication by a square wave of length $t_s$), it is a diffraction function of great width. If it is progressive (multiplication by a bell-shaped curve, a Gaussian curve or a Hanning function for example), it is another bell function whose width is inversely proportional to the length of the truncation, and c) the imperfection of the sources, which affects their stability and the precision of the frequencies emitted. In practice, it can be considered that this imperfection simply contributes to the increase in the line width.

The simplest orthogonal functions are sinusoids of different frequencies. Other orthogonal functions can also be used: functions based on Legendre polynomials, wavelets, random series, etc.

B—Reversibility of the Fourier transform

Instead of emitting a sinusoid $T_i$ of frequency $f_i$, of amplitude $A_i$ and of phase $\Phi_i$), if a composite signal $P_t$ is emitted having the sum of N sinusoids $\{f_i, A_i, \Phi_i\}$ with $1 \leq i \leq N$, all the frequencies contained in a spectral band contained between two limit frequencies $f_b$ and $f_p$, the seismogram $T_p$ observed at point R will have as the Fourier transform at frequency $f_i$ the number of amplitude $A_i$ and of phase $\Phi_i$ equal to the amplitude and to the phase of sinusoid $T_i$. It is thus possible, by successively emitting all the sinusoids of frequencies $f_b$ to $f_p$, to reconstruct seismogram $T_t$ by inverse Fourier transform.

In cases where, for example, all the amplitudes $A_i$ are equal to 1 and all the phases $\Phi_i=0$, the signal $P_t$ obtained is very close to the signal resulting from cross-correlation of a sliding-frequency signal contained in the $[f_b-f_d]$ range (sweep), commonly used in vibroseismic methods. According to the discrete Fourier transform theory, well-known to those skilled in the art, if it is desired to listen to source $S_1$ during the:time $t_c$, the frequency increment between the sinusoids is $\Delta f=1/t_c$ and the number of sinusoids required is $N_f=(f_f-f_b)t_c$.

N vibrators installed in the field can thus be excited simultaneously by means of vibrational signals whose frequencies are such that each source is successively excited by each one of the $N_f$ sinusoids above at any time, on condition that the respective frequencies of the sinusoids emitted at the same time by the various vibrators are all different. Separation of the signals received by the pickups in the field, in response to the simultaneous emission of the various signals, is thus obtained by selection of the line at the suitable frequency.

Figure 5:
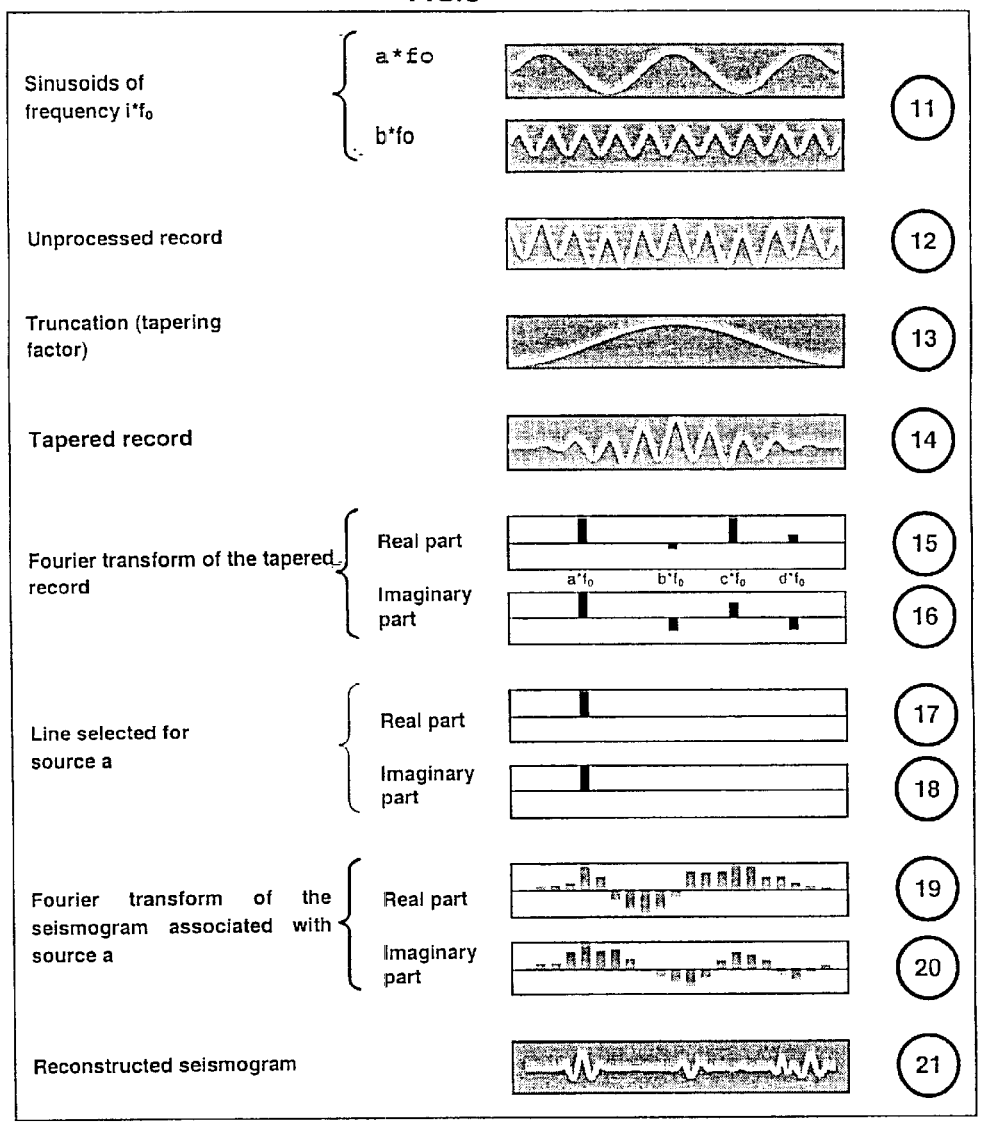
FIG. 5 illustrates the various stages of the algorithm for implementing the method, and FIG. 6 diagrammatically shows the path of the waves between two emission points X1 and X2 and a common reception point.

FIG. 5 diagrammatically illustrates the various stages of the method. Sinusoidal pilot signals 11 of respective frequencies $af_0$, $bf_0$, $cf_0$, $df_0$, etc., are simultaneously applied to the various seismic sources 5 installed in the field and coefficients a, b, c, d, etc. are selected so that these frequencies are different from one another and different from their respective harmonics. These frequencies are whole multiples of a fundamental frequency $f_0$.

The seismogram 12 that is obtained by recording the waves received by the pickups of the various antennas 4 is a linear combination of the seismograms that would have been obtained by exciting sources 5 sequentially.

The recorded signals are then weighted by multiplying them by a bell weighting factor referred to as tapering factor 13 in order to form tapered or weighted signals 14. The real part 15 and the imaginary part 16 of the Fourier transform of the tapered signals are then calculated. Each part has impulses separate from one another. For each source 5, only the real number 17 and the imaginary number 18 forming the complex value of the Fourier transform at the frequency emitted by the source are then retained.

The sets of various numbers 17 and 18 when the source emits all the programmed frequencies form the real part 19 and the imaginary part 20 of the seismogram 21 associated with the source. This seismogram is obtained by inverse Fourier transform.

Figure 1:
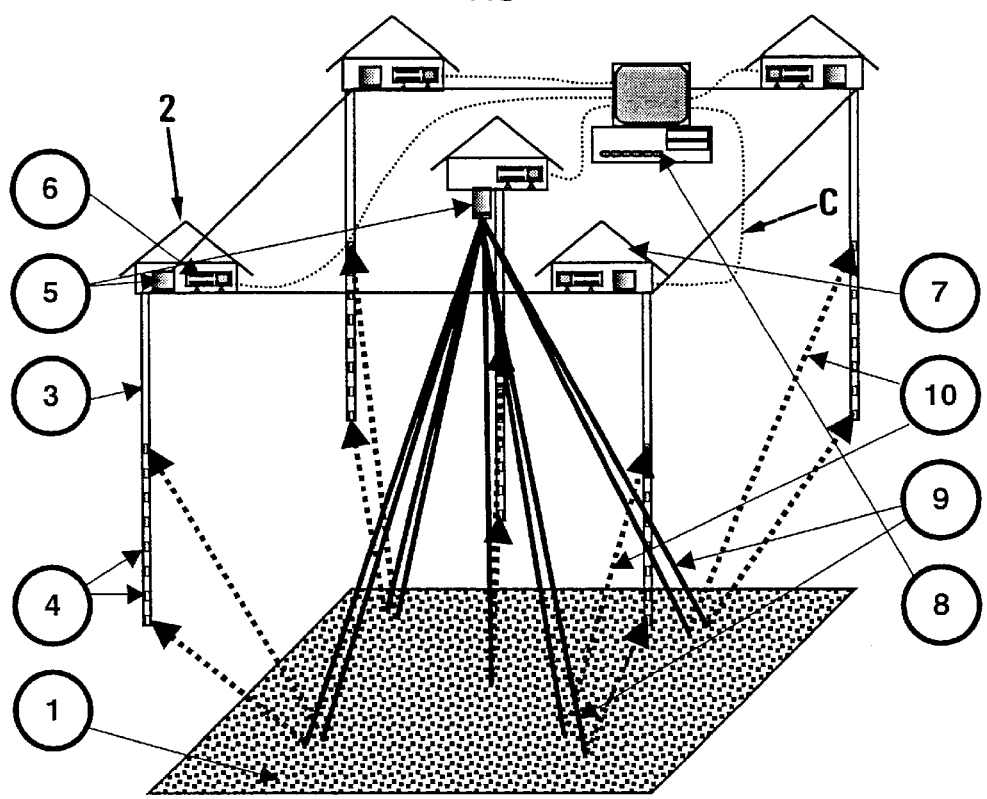
FIG. 1 diagrammatically shows a system intended for monitoring of an underground formation, comprising several signal emission and acquisition units.
Figure 2:
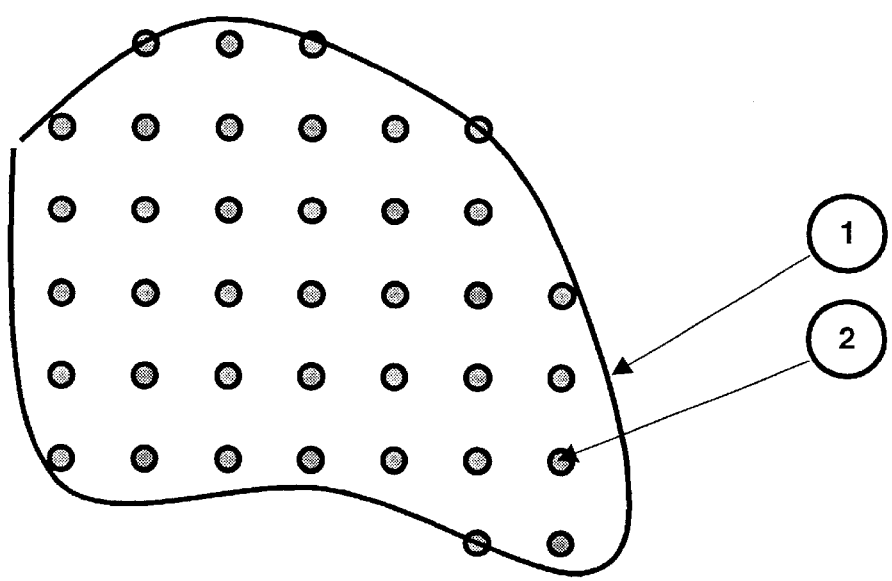
FIG. 2 shows an example of distribution, at the surface, of monitoring:devices, FIG. 3 diagrammatically shows a signal emission and acquisition unit comprising seismic pickups arranged so as to form antennas.
Figure 3:
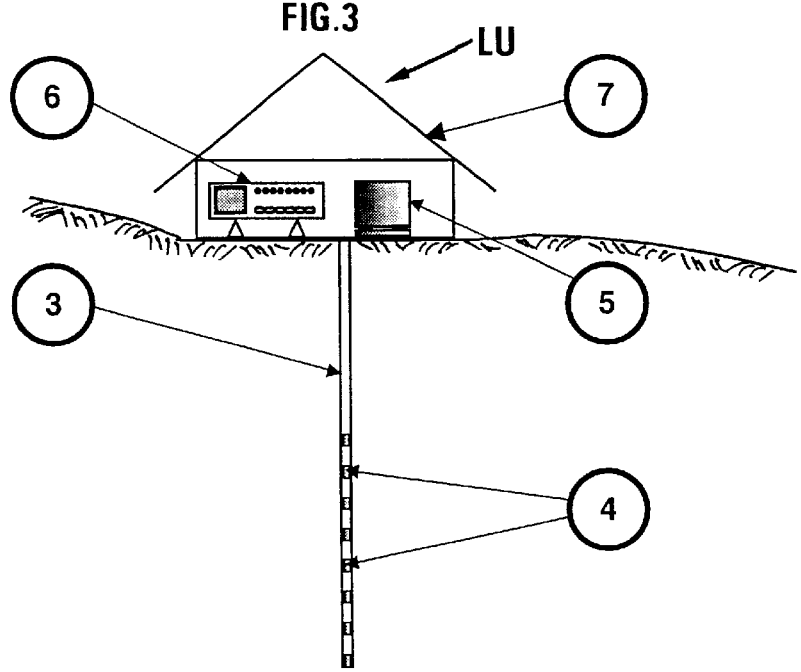

According to a first example of implementation of the method, the system comprises a plurality of local units LU each comprising an antenna 2 connected by cables (not shown) and a local acquisition and processing device 6 (FIGS. 1, 2), and the various vibrators are connected by cables C for example to a central control and synchronization unit 8 comprising a signal generator (not shown) which generates, for the various vibrators 5, the orthogonal pilot signals defined above.

Figure 4:
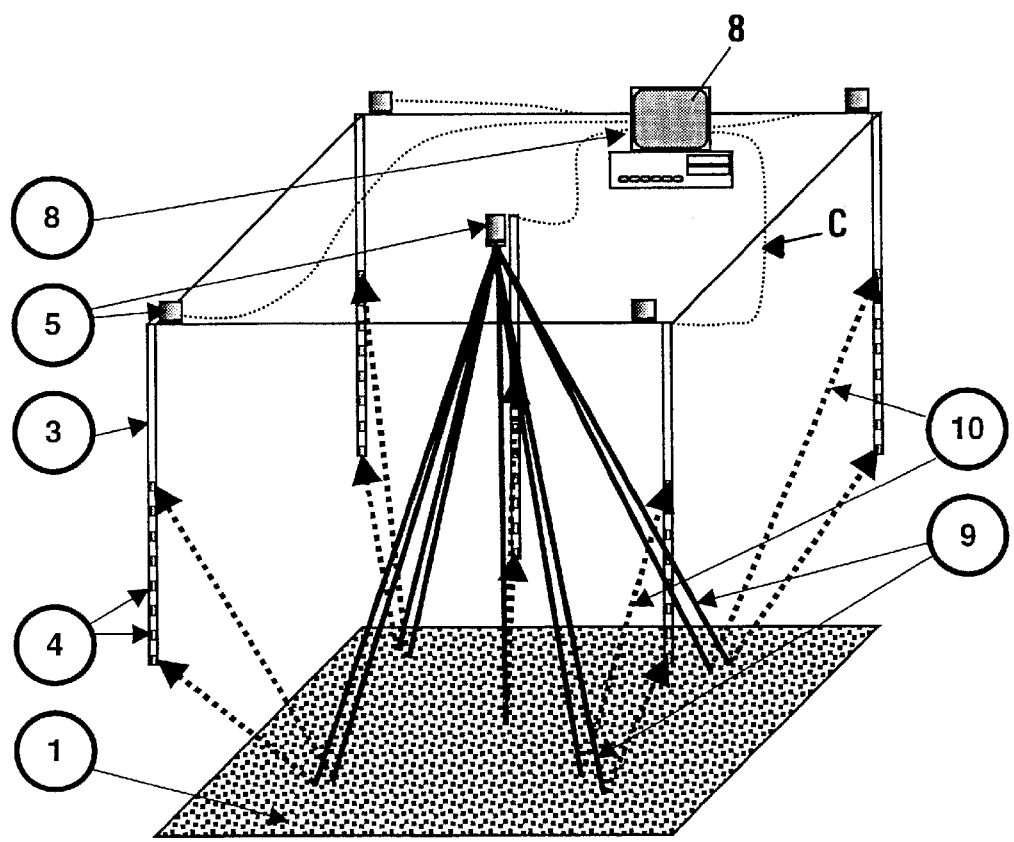
FIG. 4 shows a variant of the monitoring system of FIG. 1 where the seismic signal acquisition means are centralized in a central station.

According to another implementation mode (FIG. 4), the various reception antennas 2 are connected by cables C for example to central control and synchronization unit 8 which fulfils the tasks of generation of the composite signals for the various sources 5 and acquisition and recording of the signals received by pickups 4, as well as processing of the acquired signals.

Of course, cables C can in general be replaced by any material or wireless link (radio link, optical fiber, etc.).

Local acquisiton and processing devices 6 and/or central control and synchronization unit 8 comprise computers such as PCs programmed to carry out processings intended to isolate and to reconstitute the seismograms corresponding to the specific contributions of the various vibrators 5 as defined in the description.

What is claimed is:

1. A method of seismic monitoring an underground formation comprising:

continuously emitting seismic waves in the formation by coupling with the formation at least two vibrators which emit seismic waves simultaneously and are controlled by orthogonal pilot signals, each pilot signal having a fundamental component and harmonics thereof, frequencies of the fundamental component and of the harmonics thereof being different so as to form a composite vibrational signal;

receiving signals emanating from the formation in response to the emitted seismic waves and recording the received signals; and processing the recorded signals including discriminating respective contributions of the vibrators to the composite vibrational signal and reconstructing seismograms equivalent to seismograms that would be obtained by actuating the vibrators separately.

2. A method as claimed in claim 1, wherein:

the orthogonal signals are sinusoids.

3. A method as claimed in claim 2, wherein:

discrimination of the respective contributions of the vibrators includes determining an amplitude and a phase of the composite vibrational signal at fundamental frequencies of the pilot signals controlling the at least two vibrators.

4. A method as claimed in claim 2, wherein:

discrimination of the respective contributions of the vibrators includes weighting the recorded signals by a bell weighting factor and determining an amplitude and a phase of the composite signal.

5. A method as claimed in claim 2, wherein:

discrimination of the respective contributions of the vibrators includes weighting the recorded signals by a bell weighting factor and determining an amplitude and a phase of the composite signal and the discrimination of the respective contributions of the vibrators includes selecting, by Fourier transform, lines of a spectrum respectively associated with the weighted recorded signals.

6. A method as claimed in claim 4, herein:

reconstruction of the seismograms corresponding to the at least two vibrators includes applying, after separation thereof, an inverse Fourier transform to lines of the spectrum respectively associated with the weighted signals.

7. A method as claimed in claim 2, comprising:

shifting respective frequencies of the orthogonal pilot signals by frequency intervals, at predetermined time intervals, so as to sweep an emission frequency band.

8. A system for seismic monitoring of an underground formation, comprising at least two vibrators to be coupled with the formation, an assembly for generating sinusoidal orthogonal pilot signals, each pilot signal comprising a fundamental component and harmonics thereof, respective frequencies of the fundamental component and the respective harmonics thereof being different and a connecting means for applying the orthogonal pilot signals respectively to the at least two vibrators to generate in the formation a composite vibrational signal, a seismic reception device for reception of seismic signals emanating from the formation in response to the emitted seismic waves, a recording set for recording the received signals, and a processing means including f at least one processor for discriminating respective contributions of the at least two vibrators to the composite vibrational signal and reconstructing seismograms equivalent to seismograms that would be obtained by actuating the vibrators separately.

9. A system as claimed in claim 8, comprising:

a plurality of local units located at a distance from one another and coupled with the formation, each local unit comprising at least one seismic sensor, a seismic vibrator and a local device for acquiring and processing received signals, and a central control and a synchronization unit connected to the plurality of local units and comprising a signal generator generating the orthogonal pilot signals.

10. A system as claimed in claim 9, wherein:

the connection of the central control and synchronization unit to the plurality of local units is by one of cable or an electromagnetic link.

11. A system as claimed in claim 9, comprising:

a plurality of local units located at a distance from one another and coupled with the formation, each local unit comprising at least one seismic sensor and a seismic vibrator, and a central control and synchronization unit connected with the local units comprising a signal generator for forming the orthogonal pilot signals, and means for acquiring signals received by the sensors of the local units and for reconstructing seismograms corresponding to the contributions of the vibrators.

12. A system as claimed in claim 10, comprising:

a plurality of local units located at a distance from one another and coupled with the formation, each local unit comprising at least one seismic sensor and a seismic vibrator, and a central control and synchronization unit connected with the local units comprising a signal generator for forming the orthogonal pilot signals, and means for acquiring signals received by the sensors of the local units and for reconstructing seismograms corresponding to the contributions of the vibrators.

13. A system as claimed in claim 8, wherein:

the seismic reception device comprises at least one antenna including seismic sensors located along a well extending through the formation with the antenna being connected to the recording set.

* * * * *